United States Patent
Chamberlain (10) Patent No.: US 7,266,696 B2
(45) Date of Patent: Sep. 4, 2007

(54) ELECTRONIC POSTMARKING WITHOUT DIRECTLY UTILIZING AN ELECTRONIC POSTMARK SERVER

(75) Inventor: Charles R. Chamberlain, Arlington, VA (US)

(73) Assignee: United States Postal Service, Washington, DC (US)

( * ) Notice: Subject to any disclaimer, the term of this patent is extended or adjusted under 35 U.S.C. 154(b) by 719 days.

(21) Appl. No.: 10/450,469

(22) PCT Filed: Dec. 17, 2001

(86) PCT No.: PCT/US01/47720

§ 371 (c)(1),
(2), (4) Date: Jun. 13, 2003

(87) PCT Pub. No.: WO02/49269

PCT Pub. Date: Jun. 20, 2002

(65) Prior Publication Data

US 2004/0034780 A1     Feb. 19, 2004

Related U.S. Application Data (60) Provisional application No. 60/255,432, filed on Dec. 15, 2000.

(51) Int. Cl.
*H04L 9/00*     (2006.01)

(52) U.S. Cl. .................... 713/176; 713/178; 713/181

(58) Field of Classification Search ................ 713/161, 713/170, 175–176, 178–179, 181; 705/60, 705/62
See application file for complete search history.

(56) References Cited

U.S. PATENT DOCUMENTS

| | | | |
|---|---|---|---|
| 3,978,457 A | 8/1976 | Check, Jr. et al. | 340/172.5 |
| 4,093,999 A | 6/1978 | Fuller et al. | 364/900 |
| 4,097,923 A | 6/1978 | Eckert, Jr. et al. | 364/900 |
| 4,271,481 A | 6/1981 | Check, Jr. et al. | 364/900 |

(Continued)

FOREIGN PATENT DOCUMENTS

EP     0 589 723     3/1994

(Continued)

OTHER PUBLICATIONS

Co-Pending U.S. Appl. No. 10/450,613; Title: Method of Using Personal Signature as Postage; U.S. Filing Date: Jun. 17, 2003.

(Continued)

*Primary Examiner*—Hosuk Song
(74) *Attorney, Agent, or Firm*—Finnegan, Henderson, Farabow, Garrett & Dunner (57) ABSTRACT

Systems and methods for performing electronic postmarking of data, without directly utilizing a regular electronic postmark (EPM) server (110), including receiving data from a data acquisition device (102), generating a MicroEPM data structure (106) comprising a time stamp, a digital signature, and the received data and transferring the MicroEPM data structure (106) to a regular EPM server (110).

3 Claims, 6 Drawing Sheets

U.S. PATENT DOCUMENTS

| | | | |
|---|---|---|---|
| 4,376,299 A | 3/1983 | Rivest | 364/900 |
| 4,637,051 A | 1/1987 | Clark | 382/1 |
| 4,641,346 A | 2/1987 | Clark et al. | 380/3 |
| 4,641,347 A | 2/1987 | Clark et al. | 380/3 |
| 4,660,221 A | 4/1987 | Dlugos | 380/23 |
| 4,675,841 A | 6/1987 | Check, Jr. et al. | 364/900 |
| 4,725,718 A | 2/1988 | Sansone et al. | 235/495 |
| 4,743,747 A | 5/1988 | Fougere et al. | 235/494 |
| 4,757,537 A | 7/1988 | Edelmann et al. | 380/51 |
| 4,760,534 A | 7/1988 | Fougere et al. | 364/466 |
| 4,775,246 A | 10/1988 | Edelmann et al. | 380/23 |
| 4,809,185 A | 2/1989 | Talmadge | 364/464.02 |
| 4,811,234 A | 3/1989 | Storace | 364/464.02 |
| 4,812,965 A | 3/1989 | Taylor | 364/550 |
| 4,812,992 A | 3/1989 | Storace et al. | 364/464.02 |
| 4,831,555 A | 5/1989 | Sansone et al. | 364/519 |
| 4,835,713 A | 5/1989 | Pastor | 364/519 |
| 4,837,701 A | 6/1989 | Sansone et al. | 364/464.03 |
| 4,853,864 A | 8/1989 | Hart et al. | 364/464.02 |
| 4,853,865 A | 8/1989 | Sansone et al. | 364/464.02 |
| 4,858,138 A | 8/1989 | Talmadge | 364/464.02 |
| 4,864,506 A | 9/1989 | Storace | 364/464.02 |
| 4,873,645 A | 10/1989 | Hunter et al. | 364/479 |
| 4,907,161 A | 3/1990 | Sansone et al. | 364/464.02 |
| 4,934,846 A | 6/1990 | Gilham | 400/104 |
| 4,949,381 A | 8/1990 | Pastor | 380/51 |
| 4,978,839 A | 12/1990 | Chen et al. | 235/375 |
| 4,999,481 A | 3/1991 | Baer et al. | 235/375 |
| 5,019,991 A | 5/1991 | Sansone et al. | 364/464.03 |
| 5,022,080 A | 6/1991 | Durst et al. | 380/23 |
| 5,181,245 A | 1/1993 | Jones | 380/23 |
| 5,186,498 A | 2/1993 | Dietrich | 283/67 |
| 5,189,700 A | 2/1993 | Blandford | 380/23 |
| 5,200,903 A | 4/1993 | Gilham | 364/464.02 |
| 5,202,914 A | 4/1993 | Kim et al. | 379/97 |
| 5,224,046 A | 6/1993 | Kim et al. | 364/464.02 |
| 5,257,197 A | 10/1993 | Gunther et al. | 364/464.02 |
| 5,258,906 A | 11/1993 | Kroll et al. | 364/401 |
| 5,280,531 A | 1/1994 | Hunter | 382/1 |
| 5,293,319 A | 3/1994 | DeSha et al. | 364/464.02 |
| 5,309,363 A | 5/1994 | Graves et al. | 364/464.02 |
| 5,319,562 A | 6/1994 | Whitehouse | 364/464.03 |
| 5,337,361 A | 8/1994 | Wang et al. | 380/51 |
| 5,375,172 A | 12/1994 | Chrosny | 380/51 |
| 5,390,251 A | 2/1995 | Pastor et al. | 380/21 |
| 5,422,954 A | 6/1995 | Berson | 380/51 |
| 5,457,642 A | 10/1995 | Brookner | 364/569 |
| 5,471,533 A | 11/1995 | Wang et al. | 380/51 |
| 5,490,217 A | 2/1996 | Wang et al. | 380/51 |
| 5,510,922 A | 4/1996 | Naito | 359/124 |
| 5,526,271 A | 6/1996 | Abumehdi | 364/464.02 |
| 5,535,127 A | 7/1996 | Uno et al. | 364/464.02 |
| 5,535,279 A | 7/1996 | Seestrom | 380/55 |
| 5,583,779 A | 12/1996 | Naclerio et al. | 364/464.02 |
| 5,586,036 A | 12/1996 | Pintsov | 364/464.02 |
| 5,606,507 A | 2/1997 | Kara | 364/464.18 |
| 5,612,889 A | 3/1997 | Pintsov et al. | 364/478.14 |
| 5,638,283 A | 6/1997 | Herbert | 364/464.2 |
| 5,717,596 A | 2/1998 | Bernard et al. | 364/464.02 |
| 5,774,554 A | 6/1998 | Gilham | 380/51 |
| 5,869,819 A | 2/1999 | Knowles et al. | 235/375 |
| 5,917,924 A | 6/1999 | Herbert | 382/101 |
| 5,923,763 A * | 7/1999 | Walker et al. | 380/51 |
| 5,936,865 A | 8/1999 | Pintsov et al. | 364/478.14 |
| 5,978,781 A | 11/1999 | Sansone | 705/408 |
| 6,006,211 A | 12/1999 | Sansone et al. | 705/410 |
| 6,032,138 A | 2/2000 | McFiggans et al. | 705/410 |
| 6,064,993 A | 5/2000 | Ryan, Jr. | 705/403 |
| 6,064,995 A | 5/2000 | Sansone et al. | 705/410 |
| 6,112,193 A | 8/2000 | Dlugos et al. | 705/408 |
| 6,119,228 A | 9/2000 | Angelo et al. | |
| 6,125,357 A | 9/2000 | Pintsov | 705/408 |
| 6,233,568 B1 | 5/2001 | Kara | 705/410 |
| 6,285,990 B1 | 9/2001 | Lee et al. | 705/60 |
| 6,311,892 B1 | 11/2001 | O'Callaghan et al. | 235/375 |
| 6,321,992 B1 | 11/2001 | Knowles et al. | 235/478.01 |
| 6,385,504 B1 | 5/2002 | Pintsov et al. | 700/226 |
| 6,394,354 B1 | 5/2002 | Wilz, Sr. et al. | 235/472.01 |
| 6,408,286 B1 | 6/2002 | Heiden | 705/408 |
| 6,549,892 B1 | 4/2003 | Sansone | 705/401 |
| 2001/0002485 A1 | 5/2001 | Bisbee et al. | |
| 2001/0034716 A1 | 10/2001 | Goodwin | 705/60 |
| 2001/0044783 A1 | 11/2001 | Weisberg et al. | 705/62 |
| 2002/0019938 A1 | 2/2002 | Aarons | 713/168 |
| 2003/0225711 A1 | 12/2003 | Paping | 705/404 |

FOREIGN PATENT DOCUMENTS

| | | |
|---|---|---|
| EP | 0 732 673 | 9/1996 |
| WO | WO88/01818 | 3/1988 |
| WO | WO97/14482 | 4/1997 |
| WO | WO 01/03363 A1 | 1/2001 |
| WO | WO 02/21388 | 3/2002 |

OTHER PUBLICATIONS

Co-Pending U.S. Appl. No. 10/630,589; Title: Systems and Methods for Mid-Stream Postage Adjustment; U.S. Filing Date: Jul. 29, 2003.

Co-Pending U.S. Appl. No. 10/628,411; Title: PC Postage™ Service Indicia Design for Shipping Label; U.S. Filing Date: Jul. 29, 2003.

International Search Report in PCT/US01/47720, mailed May 14, 2002 (3 pages).

International Search Report in PCT/US01/48271, mailed Aug. 29, 2002 (3 pages).

International Search Report in PCT/US03/23492, mailed Nov. 12, 2003 (5 pages).

International Search Report in PCT/US03/23490, mailed Mar. 5, 2004 (4 pages).

Gilbert—"Rating Systems Help Carriers Shine," National Underwriter (Property & Casualty/Risk & Benefits Management), Jul. 29, 1996, vol. 100, No. 31 (2 pages).

PR Newswire—"Stamps.com Launches New Enhanced Version of Internet Postage," Jul. 18, 2000 (3 pages).

Global Express Guaranteed: Frequently Asked Questions, https://sss-web.usps.com/gxg/jsps/showFAQ.isp, website printout dated Apr. 24, 2003 (6 pages).

Global Express Guaranteed: Introducing . . . , https://sss-web.usps.com/oxg/jsps/index.jsp, website printout dated Apr. 24, 2003 (1 page).

Global Express Guaranteed: System Requirements for Label Printing, https://sss-web.usps.com/gxg/isps/showSystemRegs.isp, website printout dated Apr. 24, 2003 (1 page).

Information Week, Click-And-Mail Services Cancel Post-Office Hassles, Jul. 24, 2000, http://www.informationweek.com/796/prpostage.htm, website printout dated Apr. 24, 2003 (4 pages).

InternetWeek, Back to Reality: Postal Service Reboots E-Biz, Aug. 13, 2001, http://www.internetweek.com/newslead01/lead081301.htm?ls=TW_070202_fea, website printout dated Apr. 24, 2003 (4 pages).

Markets: Small Biz, Small Business Welcomes PC Postage, Mar. 2, 2000, http://cyberatlas.internet.com/markets/smallbiz/article/0.1323.10098_314571.00.html, website printout dated Apr. 24, 2003 (3 pages).

Stamps.com Launches New Enhanced Version of Internet Postage, Jul. 18, 2000, http://investor.stamps.com/news/20000718-17949.cfm, website printout dated Apr. 24, 2003 (3 pages).

USPS—Print Shipping Label—Frequently Asked Questions, https://sss.web.usps.com/ds/isps/showFaq.isp, website printout dated Apr. 24, 2003 (5 pages).

Postage Meters and PC Postage Systems, 024 Quick Service Guide, Jun. 2003 (2 pages).

Global Express Guaranteed, sample Web Air Waybill/Shipping Invoice (1 page).

PC Postage™ Products Refund Request for Unused Postage, PS Form 3533-PCP-X (1 page).

Dreifus et al.—"Smart Cards: A Guide to Building and Managing Smart Card Applications," Chapter 4, John Wiley & Sons, 1998 (3 pages).

Clark—"IT Manager's Guide to Virtual Private Networks," Chapter 3, The McGraw-Hill Companies, Inc., 1999 (3 pages).

Bott et al.—"Special Edition Using Microsoft Office 2000," Chapter 4, Que Corporation, 1999, (1 page).

Muller—"Desktop Encyclopedia of Voice and Data Networking," Section U, The McGraw-Hill Companies, Inc., 2000 (6 pages).

Hendry—"Smart Card Security and Applications," Chapter 8, Artech House, Inc., 1997 (2 pages).

Johnson et al.—"Upgrading and Repairing Your PC Answers! Certified Tech Support," Chapter 5, The McGraw-Hill Companies, 1998 (1 page).

* cited by examiner

ELECTRONIC POSTMARKING WITHOUT DIRECTLY UTILIZING AN ELECTRONIC POSTMARK SERVER

CROSS REFERENCE TO RELATED APPLICATIONS

This application claims the benefit of provisional application "System and Method for Performing Electronic Postmarking without Directly utilizing an Electronic Postmark Server," filed Dec. 15, 2000 and assigned Ser. No. 60/255,432.

Application Ser. No. 60/255,432 is expressly incorporated herein by reference.

FIELD OF THE INVENTION

The present invention relates to the field of generating electronic postmarks, and more specifically relates to the field of electronically postmarking data without directly utilizing a regular electronic postmark server.

BACKGROUND

An electronic postmark, or EPM, provides content and temporal integrity and identification authenticity for data, which is transferred over a network. The process of generating an EPM utilizing a regular EPM server is described in "Systems and Methods for Authenticating an Electronic Message," U.S. Ser. No. 09/675,677 filed on Sep. 29, 2000, which is expressly incorporated herein by reference.

The MicroEPM is a system and method for performing electronic postmarking of data without directly utilizing a regular electronic postmark (EPM) server. The MicroEPM permits the generation of an electronic postmark off-line, which allows mobile devices or devices, which do not have a network, interface, to create EPMs for internally generated data. Furthermore, the invention also permits devices, which are connected to a network to generate EPMs without having to interface with an EPM server. This capability could be useful when the processing overhead of communication with an EPM server is too great, or if the EPM server is unavailable due to network problems or server downtime.

SUMMARY

In accordance with the invention, systems and methods for performing electronic postmarking of data, without directly utilizing a regular electronic postmark (EPM) server, include receiving data from a data acquisition device; generating a MicroEPM data structure comprising a time stamp, a digital signature, and the received data; and transferring the MicroEPM data structure to a regular EPM server.

Additional objects and advantages will be set forth in part in the description which follows, and in part will be obvious from the description, or may be learned by practice. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments consistent with the invention and together with the description, serve to explain the principles of the invention.

DESCRIPTION OF THE EMBODIMENTS

Reference will now be made in detail to the exemplary embodiments illustrated in the accompanying drawings. Wherever possible, the same reference numbers will be used throughout the drawings to refer to the same or like parts.

Figure 1:
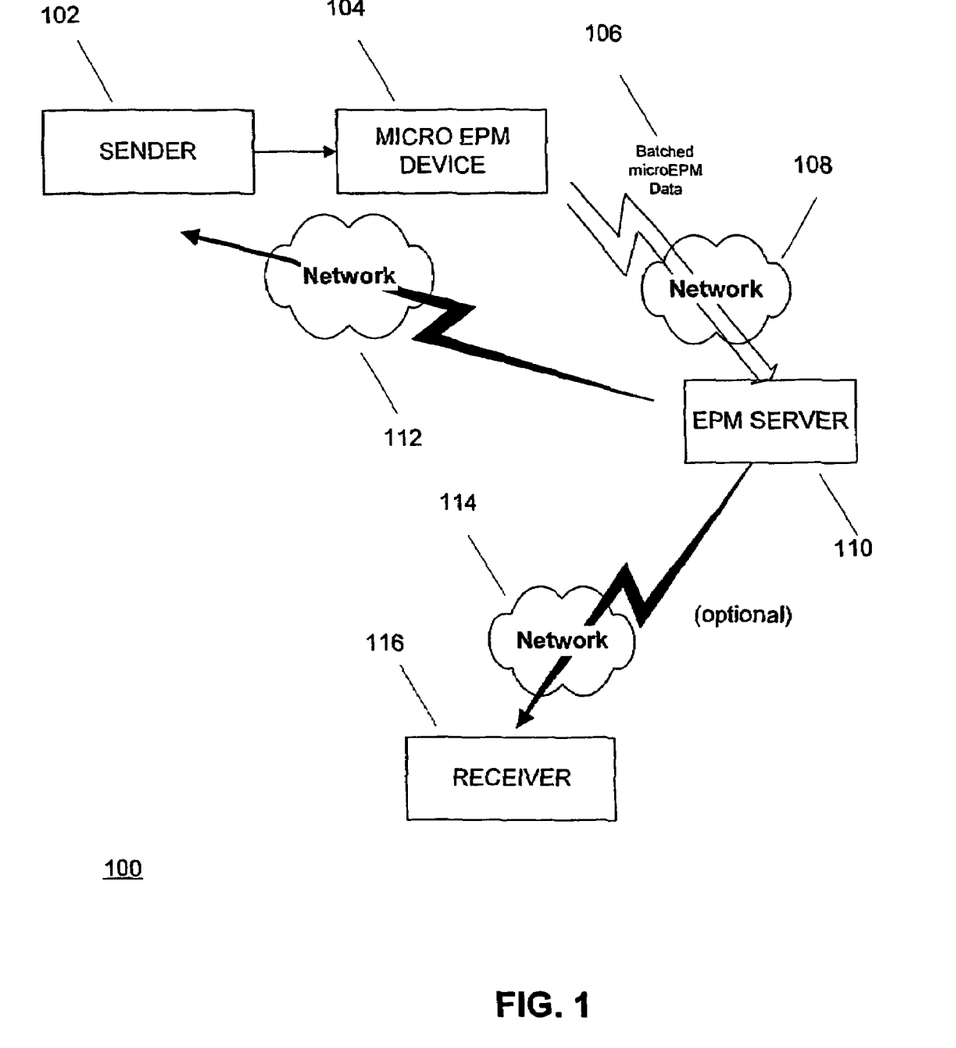
FIG. 1 depicts a top level block diagram showing the operation of a system consistent with the invention.

FIG. 1 shows a top-level block diagram of a system 100 consistent with the invention. A sender 102 generates or captures digital data, such as an electronic mail message, using a data acquisition or generation device, such as a personal computer. The data is received by a MicroEPM device 104, which generates a MicroEPM data structure using the received data, and stores the MicroEPM data structure in internal memory. The MicroEPM data structure comprises a time and date stamp, a hash value of the received data, and a digital signature, and is described below in greater detail. One or more MicroEPM data structures may be generated and stored on MicroEPM device 104, this number being limited by the amount of internal storage available. Once a set, or batch, of MicroEPM data structures (consisting of one or more Micro EPM data structures) are accumulated on MicroEPM device 104 over some period of time, MicroEPM device 104 may download the MicroEPM data structures, as a batch 106, via a network 108 to a regular EPM server 110. This downloading process allows the MicroEPM data structures to be processed and logged by EPM server 110. Upon receiving the batch of MicroEPM data structures, EPM server 110 will generate a batch EPM data structure corresponding MicroEPM data structure batch 106. Batch EPM data structure 106 may therefore correspond to a single MicroEPM data structure, or to a plurality of MicroEPM data structures. EPM server 110 may then return the batch EPM data structure back to the sender 102 over a network 112, or optionally it may forward the batch EPM data structure to a receiver 116 via a network 114, who is the intended recipient of the data generated by sender 102.

Figure 2A:
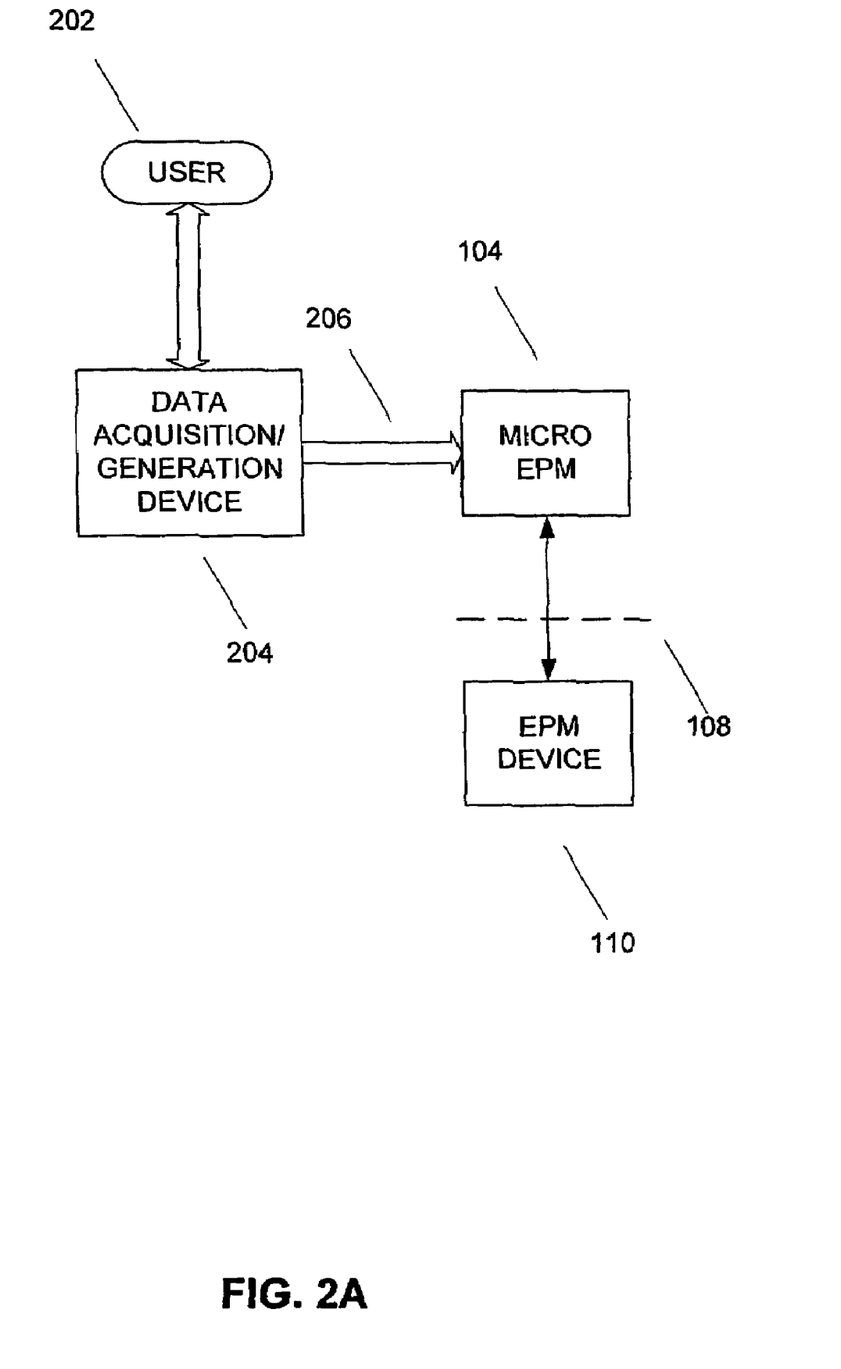
FIG. 2A depicts one embodiment consistent with the invention where the MicroEPM device is a separate, stand-alone unit.

FIG. 2A shows a MicroEPM device 104 as a separate, stand-alone unit. A user 202 operates a data acquisition/generation device 204 to generate data for electronic postmarking. Data acquisition/generation device 204 can be any kind of device, which stores information in a digital format. For example, it could be a digital camera, a digital video recorder, a personal digital assistant, a laptop computer, or any other type of electronic device, which generates or acquires digital data. Data acquisition/generation device 204 supplies digital data to an external MicroEPM device 104 through an electronic interface 206. Interface 206 could be, for example, a network such as TCP/IP, Local Area Network, or wireless network. The interface could also be a standard serial or parallel interface such as an RS-232, Universal Serial Bus (USB), IEEE-1394 (Firewire), or any other electronic interface known to those skilled in the art. The use of standard interface 206 allows MicroEPM device 104 to interface with a variety of different devices 204.

At the user's command, acquired digital data (not shown) is sent from data acquisition/generation device 204 over electronic interface 206 to external MicroEPM device 104. MicroEPM device 104 generates a MicroEPM data structure for the acquired digital data and stores the MicroEPM data structure locally. This process can be repeated for each data acquisition session, thereby storing a plurality of MicroEPM data structures in MicroEPM device 104. Afterwards, user 202 can download the MicroEPM data structures (either individually or in a batch) over network 108 to regular EPM server 110. EPM server 110 would then generate a single EPM data structure for the batch of MicroEPM data structure and send this to an electronic address (not shown).

Figure 2B:
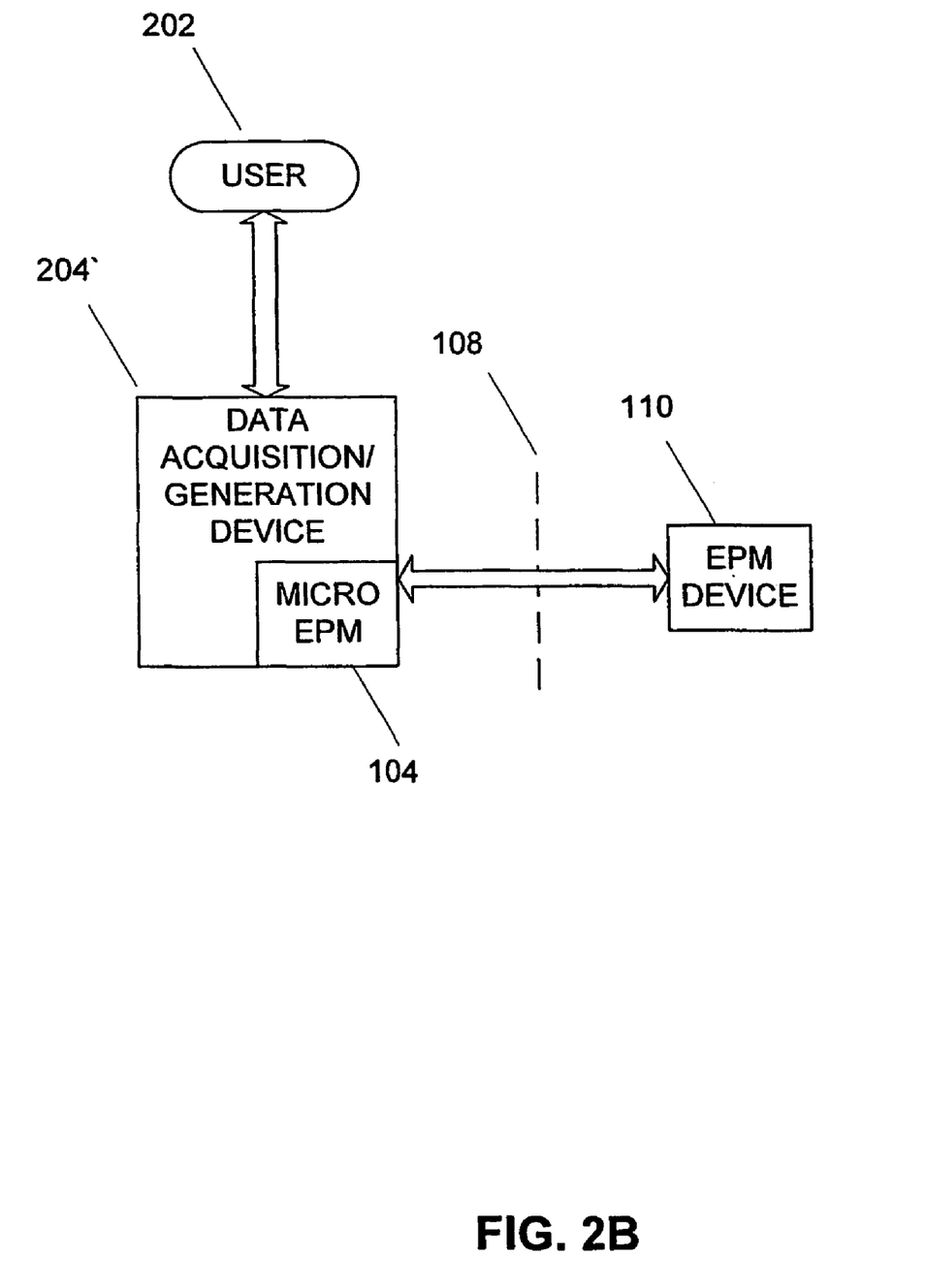
FIG. 2B depicts an embodiment consistent with the invention where the MicroEPM device is physically incorporated into the data acquisition/generation device.

FIG. 2B shows a system including a MicroEPM device 104' physically incorporated into a data acquisition/generation device 204'. As above, data acquisition/generation device 204' can be any kind of digital device which stores digital data. This digital data may be buffered in data acquisition/generation device 204', and transferred to MicroEPM device 104' at the command of user 202. Alternatively, the digital data may be automatically transferred to internal MicroEPM device 104' upon its generation. In this embodiment, MicroEPM device 104' must be small enough to fit into portable data generation/acquisition device 204', and may therefore be implemented on one or more integrated circuits. Data acquisition/generation device 204' may connect to network 108 whereby the processed MicroEPM data structures may be submitted to regular EPM sever 110 for the generation of a batch EPM of the MicroEPM data structures.

Figure 3:
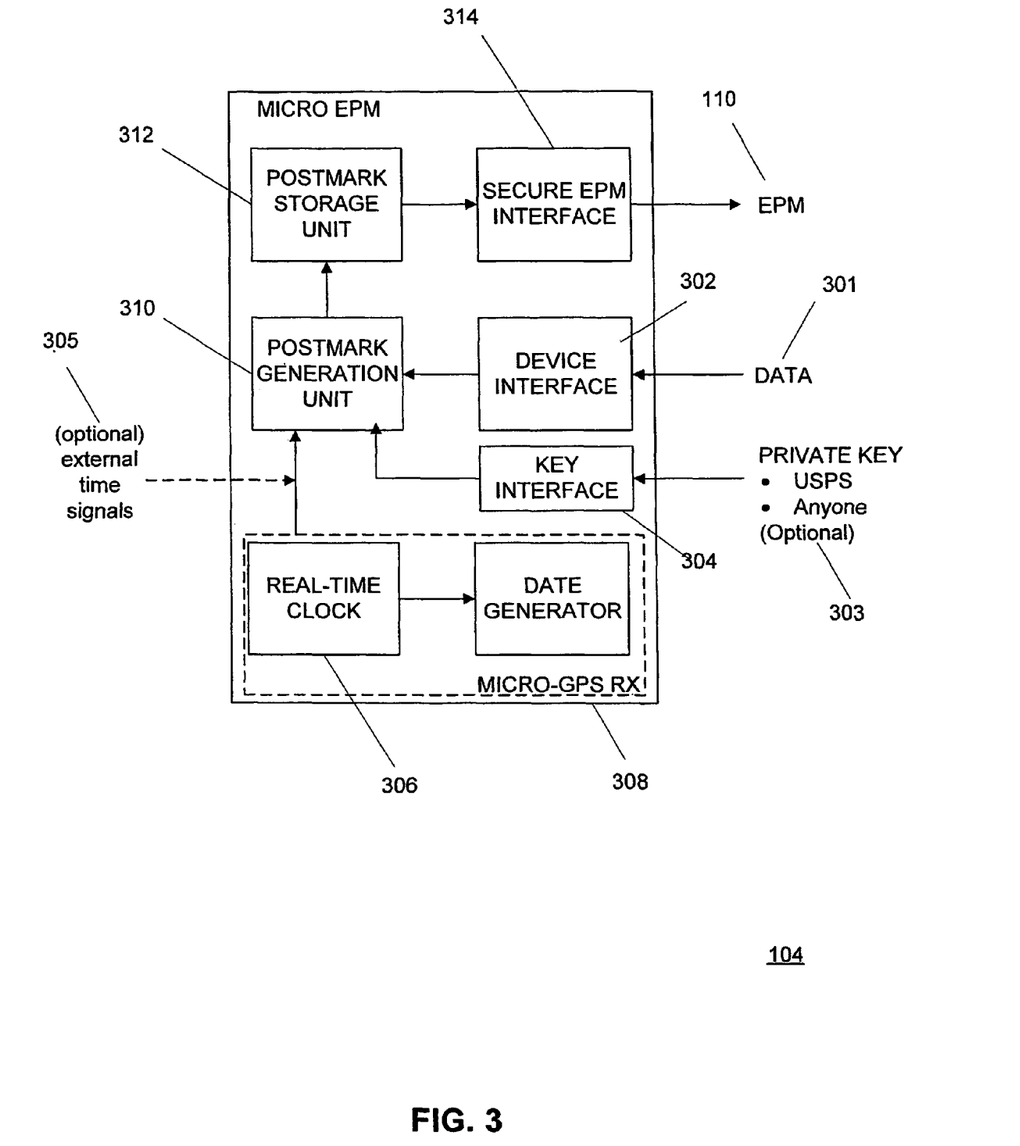
FIG. 3 shows a detailed block diagram of one embodiment consistent with the invention.

FIG. 3 shows a detailed block diagram of MicroEPM device 104. Digital data 301 arrives through an interface 302 from data acquisition/generation device 204 (not shown) using a standard protocol. A key interface 304 accepts a private key 303 from an official source, such as the United States Postal Service (USPS), or any other trusted entity which generates private keys (as described more fully in the aforementioned U.S. Postal application Ser. No. 675,677/09) for the generation of MicroEPM data structures.

A time signal providing time data is required to generate a MicroEPM data structure. The time data may be generated from external time signals 305 derived from a reference broadcast source or may be generated internally using an internal clock circuit 306. External time signals 305 may be received in the form of broadcast signals from a Global Positioning Satellite (GPS) system through a micro GPS receiver 308. Another source of broadcast time signals is National Institute of Standards Technology radio station WWV. Such broadcast sources supply highly accurate time signals that are a widely accepted reference, and therefore are considered a "trusted" time source. A source is trusted if it is both known to be accurate, and it is secure from tampering. Optionally, external time signals may also be fed directly into the MicroEPM device using an external interface (not shown). In addition, EPM server 110 may be the trusted time source.

Internal time data may be generated using timing circuits, such as quartz-oscillator/integrated circuit combinations that are used in wristwatches and are well known in the art. The user may have control over this time data, such as the ability to manually set start and stop times. Because this data is under the control of a user, it is not secure from tampering. Therefore, such time data would not be considered "trusted."

Alternatively, internal time data could be a "quasi-trusted" time source that is set once and then runs without stopping. A quasi-trusted time source provides greater security of the time source and accuracy than a non-trusted source, but not the security and accuracy of the trusted time source.

Time data, which is not from a trusted source, requires additional time data, such as, for example, external trusted time signal 305, provided from a trusted source in order to generate time stamps for the MicroEPM. This additional data need not provide precise time data, but may provide a range of times providing trusted time "boundaries" for the internally generated time data. The time boundaries may come from official EPM server 110. Details regarding time boundaries are set forth below.

Further referring to FIG. 3, using the time data, acquired digital data 301 from device 204, and acquired private key 303, a postmark generation unit 310 creates a MicroEPM data structure. Postmark generation unit 310 could be a software module running on a general-purpose microprocessor, or a dedicated integrated circuit, such as an ASIC (Application Specific Integrated Circuit). Afterwards, the MicroEPM data structure is subsequently stored in a postmark storage unit 312. Postmark storage unit 312 typically comprises physical memory such as solid state RAM, or it could be a mass storage device such as a hard drive. A plurality of MicroEPM data structures may be stored in postmark storage unit 312 as a single batch. At the user's command, the batch may be downloaded to EPM server 110 through secure a EPM interface 314.

Figure 4:
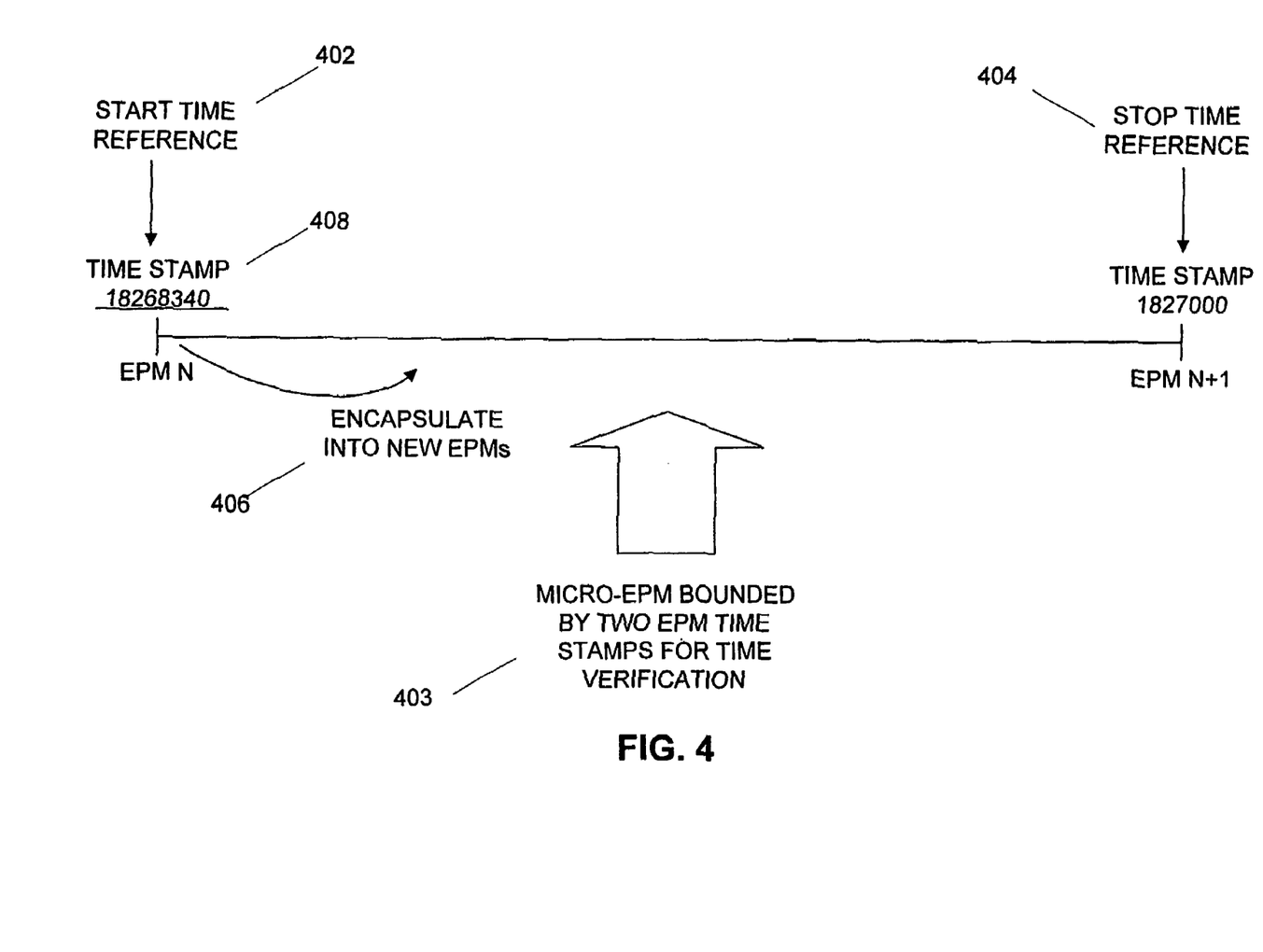
FIG. 4 provides an explanation of the trusted time boundaries.

FIG. 4 provides an explanation of the trusted time boundaries mentioned above. If the internal time data MicroEPM device 104 uses for postmarking does not come from a trusted time source, another time source must be used to be able to provide some level of temporal authenticity. Time stamps generated by EPM server 110 could be used to provide trusted time boundaries, which "anchor" the MicroEPM data structure's time stamps.

In one embodiment, EPM server 110 or MicroEPM device 104 may wish to provide a single trusted time boundary. For example, some applications may only require authentication that digital data 301 was sent prior to a time certain. For such an application, a stop time reference received from a trusted time source, such as external time signals 305, can be added as a trusted time/date stamp. Therefore, all digital data acquired before the trusted stop time reference is known to have been acquired before the stop time reference. The trusted stop time reference may be received by EPM server 110 or from any other trusted source.

In addition, for other applications, it may be necessary to know only that digital data 301 was acquired by MicroEPM device 104 after a time certain. In one embodiment, MicroEPM device 104, which does not use a trusted time source/date stamp, will include a trusted start time reference. For example, MicroEPM device 104 may have interfaced with a trusted time source at some point before digital data 301 was acquired. From the trusted time source, MicroEPM will receive a trusted time/date stamp that may be stored in memory. MicroEPM device 104 may include this reference in a MicroEPM data structure as a trusted start time reference. In addition, it may also include a time/date stamp from a source other than a trusted source.

MicroEPM device 104 may also provide both a start time reference 402 and stop time reference 404. Start reference time 402 is encapsulated into each MicroEPM data structure. As such, it must be downloaded from EPM server 110 and stored locally on MicroEPM device 104. This downloading of start reference 402 may be done automatically after a batch of MicroEPM data structures are transferred to EPM server 110, or it may be done manually at the command of user 202. Therefore, the MicroEPM data structure may contain two separate pieces of time information: 1) a time stamp 408 which is generated by the internal clock, and 2) start-time reference 402 which bounds the initial time for each MicroEPM and may have been generated by EPM server 110. Stop time reference 404 is generated once EPM server 110 electronically postmarks the batch of MicroEPM data structures. All of the time stamps for the MicroEPM data structures 403, for a given batch, fall between start reference 402 and stop reference 404.

Figure 5:
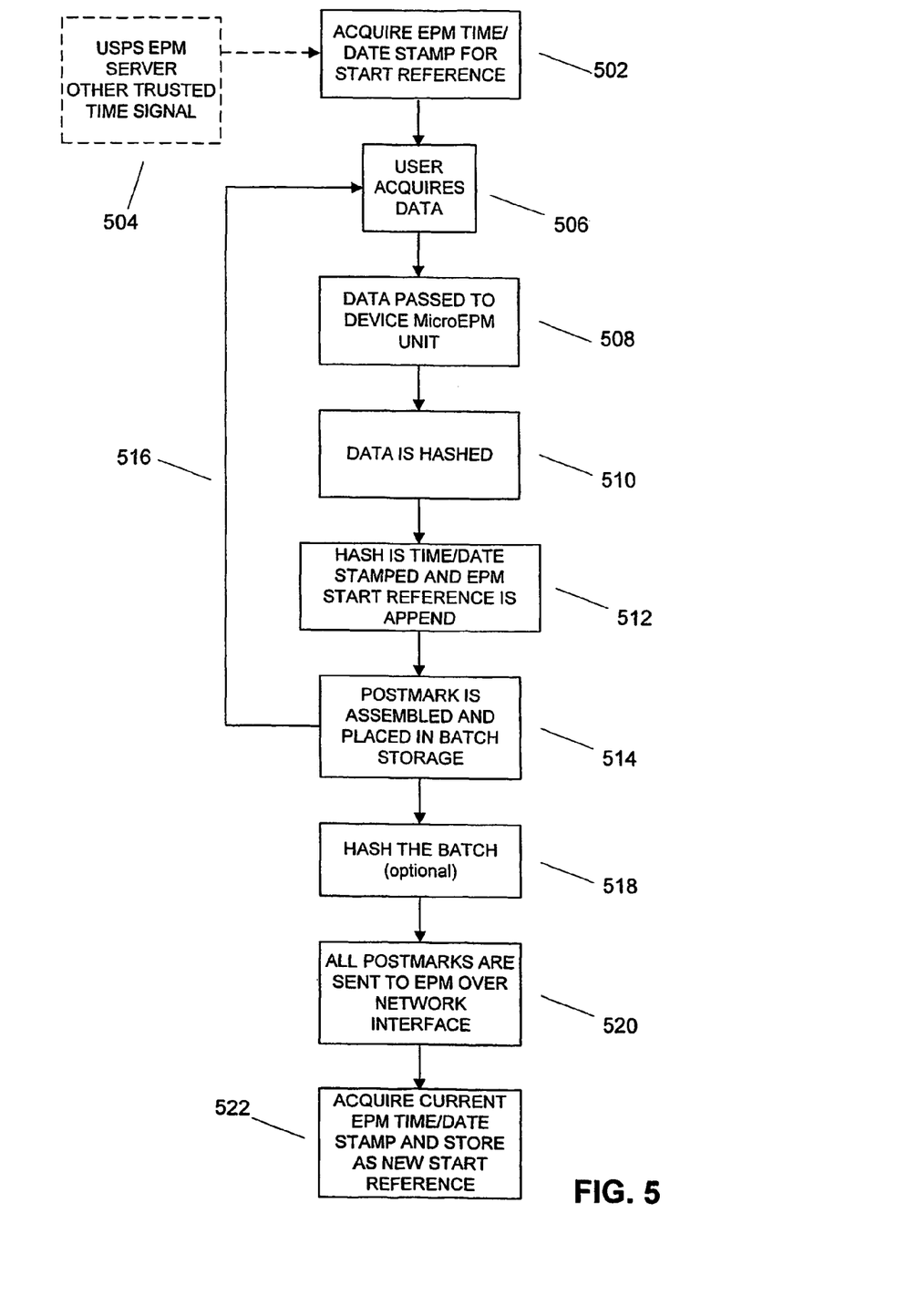
FIG. 5 depicts a flowchart showing the steps performed by MicroEPM device to generate a MicroEPM data structure.

FIG. 5 shows the stages, which MicroEPM device 104 executes when generating a MicroEPM data structure. Initially, a trusted time stamp may be acquired, stage 502, to serve as start reference time 402 for the batch of MicroEPM data structures 403. Start time reference 402 may be received from EPM server 110. Start reference time 402 is stored in memory on MicroEPM device 104. Optionally, another trusted time data source may be used if desired, stage 504. In one embodiment, if the MicroEPM does not have a trusted time source, and must ensure that a digital message was acquired after a time certain, MicroEPM device 104 will acquire a trusted start time reference 402 at either stage 502 or stage 504. However, if MicroEPM device 104 includes a trusted time source, such as external signals 305, it may still acquire a trusted start time reference.

User 202 then acquires data, stage 506, which is passed to the MicroEPM device, stage 508. The data is hashed, stage 510, typically using a one-way hash function. Any known or later developed hash function may be used. In one embodiment, a hash function, which produces a 64-bit key, is used. Therefore, the digital data is "frozen" (i.e. the integrity of the data may be checked at any time). The hash is then time/date stamped, stage 512, using data generated by the internal time source. Alternatively, if the internal source is not a trusted source, EPM server start time reference 402, acquired prior to data acquisition, is also appended.

At stage 514, the MicroEPM device 104 produces a MicroEPM data structure. In one embodiment, the hash value, internal time stamp, and start time reference (if acquired) are digitally signed using private key 303. In one embodiment, the digital signature and hash value comprise the MicroEPM data structure, which is placed in batch storage, stage 514. In another embodiment, hash value, internal time stamp, start time reference (if acquired) as well as the digital data may be digitally signed. In such a case, a MicroEPM data structure may be comprised of the hash value, the digital signature and a copy of the digital data.

The process may loop back 516, to process additional MicroEPM data structures. After all the MicroEPM data structures are batched in memory, the batch may be optionally be hashed, stage 518, for additional security. The MicroEPM data structures are then sent to regular EPM server 110 over network 108 in order to generate a "standard" EPM data structure for the batch, such as by appending a new trusted time/date stamp to the batch of MicroEPM data structures and hashing the new time date stamp, and the batch of MicroEPM data structures, stage 520. User 202 may then acquire, stage 522, the current EPM time/date stamp from server 110 and store it as the new start reference.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for performing electronic postmarking of data, without directly utilizing a regular electronic postmark (EPM) server, the method comprising:

receiving data from a data acquisition device;

generating a MicroEPM data structure comprising a hash value of the received data and a digital signature;

transferring the MicroEPM data structure to a regular EPM server; and processing, by the regular EPM server, the transferred MicroEPM data structures, wherein processing includes:

generating a trusted time/date stamp;

hashing the time/date stamp and the batch of MicroEPM data structures to produce a second hash value; and generating an EPM data structure comprising the second hash value and the batch of MicroEPM data structures.

2. An apparatus for performing electronic postmarking of data, without directly utilizing a regular electronic postmark (EPM) server, comprising:

means for receiving data from a data acquisition device;

means for generating a MicroEPM data structure comprising a hash value and a digital signature;

an interface for transferring the MicroEPM data structure to a regular EPM sever;

means for processing, by the regular EPM server, the transferred MicroEPM data structures;

means for generating a trusted time/date stamp;

means for hashing the time/date stamp and the batch of MicroEPM data structures to produce a second hash value; and means for generating an EPM data structure comprising the second hash value.

3. The apparatus of claim 2, further including; means for generating an EPM data structure comprising the second hash value and the batch of MicroEPM data structures.

* * * * *